US009718479B2

(12) United States Patent
Mishra

(10) Patent No.: US 9,718,479 B2
(45) Date of Patent: Aug. 1, 2017

(54) TRACTION MOTOR WITH SELF-CONTAINED DRIVE END BEARING LUBRICATION

(71) Applicant: Electro-Motive Diesel, Inc., LaGrange, IL (US)

(72) Inventor: Saket Mishra, Burr Ridge, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 150 days.

(21) Appl. No.: 14/841,070

(22) Filed: Aug. 31, 2015

(65) Prior Publication Data

US 2017/0057523 A1 Mar. 2, 2017

(51) Int. Cl.

*F01M 9/12* (2006.01)
*B61C 17/08* (2006.01)
*B61C 9/38* (2006.01)

(52) U.S. Cl.

CPC ................ *B61C 17/08* (2013.01); *B61C 9/38* (2013.01)

(58) Field of Classification Search

CPC ....... B61C 9/38; B61C 17/08; F16H 57/0423; B64C 11/006; F16N 7/02; F16N 7/22; F16N 7/40; F16N 2210/14; Y10T 74/19991; Y10T 74/2186

See application file for complete search history.

(56) References Cited

U.S. PATENT DOCUMENTS

| | | | | |
|---|---|---|---|---|
| 464,520 | A | 12/1891 | Pirrung | |
| 5,038,631 | A | 8/1991 | Renk et al. | |
| 8,242,651 | B2 | 8/2012 | Singhal | |
| 2008/0128212 | A1* | 6/2008 | Utzat | F16D 25/123 184/11.4 |
| 2009/0046965 | A1* | 2/2009 | Akamatsu | F16C 19/163 384/474 |
| 2013/0283758 | A1* | 10/2013 | Wotzak | F01D 25/18 60/39.08 |
| 2016/0131034 | A1* | 5/2016 | Chilton | F16N 7/363 184/6.11 |

FOREIGN PATENT DOCUMENTS

| | | |
|---|---|---|
| CN | 202847694 | 4/2013 |
| KR | 20150044137 | 4/2015 |

* cited by examiner

*Primary Examiner* — William E Dondero
*Assistant Examiner* — Robert T Reese
(74) *Attorney, Agent, or Firm* — Miller, Matthias & Hull

(57) ABSTRACT

A device for lubricating a traction motor drive end bearing is disclosed. The drive end lubrication device may include an inner cover, an outer cover, and a paddle wheel. The inner cover may include a first mating surface and the outer cover may include a second mating surface. The inner cover first mating surface may fit together with the outer cover second mating surface to form a casing and the paddle wheel may nest inside the casing.

20 Claims, 6 Drawing Sheets

336
342
337
302
306
304
212
214
300
344
338
334
340

TRACTION MOTOR WITH SELF-CONTAINED DRIVE END BEARING LUBRICATION

TECHNICAL FIELD

The present disclosure generally relates to locomotives and more particularly relates to traction motors for locomotives.

BACKGROUND

Some types of locomotives often rely on multiple traction motors to drive one or more wheels attached to one or more axles in order to propel the locomotive. A typical North American locomotive has six to eight axles and each axle is usually attached to two wheels. During operation, individual traction motors may utilize electricity produced by one or more generators powered by one or more engines of the locomotive. The traction motors use the electricity to create mechanical rotation that is transferred to a drive motor shaft and a set of reduction gears. Most commonly, a set of reduction gears includes a pinion gear and a bull gear. The drive motor shaft has a pinion gear attached to the end of the shaft opposite the motor. The pinion gear engages the bull gear, located inside the gear case. This transfer of rotation from the drive motor shaft to the pinion gear and bull gear creates the necessary torque to propel the locomotive and possibly one or more cars attached to the locomotive down the rail.

During traction motor operation the drive motor shaft may incorporate the use of drive end bearings to facilitate the rotation. Furthermore, the high rate of rotation experienced by the drive motor shaft, drive end bearings, and reduction gears may require lubrication in order to keep the parts functioning properly. A typical traction motor arrangement may incorporate a common lubricant sump located in the gear case. The lubricant in the sump may be used for lubricating drive end bearings, reduction gears and other components of the traction motor. The bull gear is enclosed in the gear case and rotates through the lubricant sump picking up lubricant in the gear teeth and splashing the lubricant within the gear case. Some of the lubricant splashes into a receptacle that feeds a lubrication pathway from the gear case into the drive end bearing. The lubricant that enters into the receptacle moves across the drive end bearing to provide lubrication to the bearing and any excess lubricant is returned to the sump in the gear case through a return duct.

This type of lubrication arrangement, however, has some limitations. In some situations the rotation speed of the drive motor shaft may push the limits of the common lubricant shared by the drive end bearing and the reduction gears. Under these operating conditions, the increased rotation speed of the drive motor shaft may require use of a lower viscosity lubricant for the drive end bearing. However, use of a lower viscosity lubricant is not ideal for proper lubrication of the reduction gears. Furthermore, placing a lower viscosity lubricant in the gear case sump creates additional difficulties in ensuring the gear case is leak proof. A typical gear case design has numerous interfaces and other features and using a lower viscosity lubricant makes it increasingly difficult to ensure the gear case is leak-proof. As a result, alternative traction motor designs are sought that can provide separate lubricant sources for the drive end bearing and reduction gears.

An alternative lubricant device is described in U.S. Pat. No. 5,038,631 (the '631 patent). The '631 patent discloses a lubricant restricting device for a traction motor drive gear assembly that is positioned between a mounting plate and the back side of a pinion gear. The restricting device is molded from an elastomeric or semi-elastomer material. The device has a base and a barrier structure formed by a lip or series of lips. The base is circular in shape and the lips are formed in spaced apart concentric circles. To reduce the lubricant flow between the pinion gear and mounting plate the lips extend to make contact with the pinion gear.

While in some applications the lubricant device described in the '631 patent may aid in diverting the flow of lubricant in a traction motor gear case, the device does not provide a self-contained lubrication device for a drive motor bearing. Rather, the device seeks to limit the flow of lubricant between the pinion gear and the mounting plate of the gear case in order to minimize the migration of gear lubricant into the armature shaft bearing assembly. Additionally, the device described in the '631 patent fails to disclose an additional lubricant source for the drive motor bearing, nor does it disclose a circulation path for the drive motor bearing lubrication.

The self-contained lubrication device of the present disclosure is directed at solving one or more of the problems set forth above and/or other problems associated with the prior art.

SUMMARY OF THE DISCLOSURE

In accordance with one embodiment of the present disclosure, a lubrication device for a traction motor is disclosed. The lubrication device may include an inner cover, the inner cover having a first side and a second side, the second side having a first mating surface. Additionally, the lubrication device may include an outer cover, the outer cover having a first side and a second side, the first side having a second mating surface. The lubrication device may also include a paddle wheel, the first mating surface of the inner cover and the second mating surface of the outer cover fitting together to form a casing, the paddle wheel nesting inside the casing positioned between the inner cover and the outer cover.

In accordance with another embodiment of the present disclosure, a traction motor assembly is disclosed. This traction motor assembly may include a traction motor drive shaft, a drive end bearing to facilitate rotation of the traction motor drive shaft, a bearing housing arranged to contain the drive end bearing, and a drive end bearing lubrication device for lubrication of the drive end bearing. Furthermore, the traction motor assembly may include a drive end bearing device having an inner cover, the inner cover having a first side and a second side, the second side having a first mating surface. Additionally, the traction motor assembly may include an outer cover, the outer cover having a first side and a second side, the first side having a second mating surface. Moreover, the traction motor assembly may include a paddle wheel, the first mating surface of the inner cover and the second mating surface of the outer cover fitting together to form a casing and the paddle wheel nesting inside the casing between the inner cover and the outer cover. The casing and the paddle wheel may have a central opening extending through the inner cover, the outer cover and the paddle wheel and the traction motor drive shaft may extend through the opening in the casing and the paddle wheel.

In yet another embodiment of the present disclosure, a method of lubricating a traction motor drive end bearing is disclosed. The method of lubricating a traction motor drive end bearing may include providing a motor drive end bearing lubrication device on a traction motor drive shaft, the motor drive end bearing lubrication device having an inner cover, the inner cover having a first mating surface. The method may further provide a lubrication device including an outer cover, the outer cover having a second mating surface. Additionally, the method may provide a lubrication device including a paddle wheel, the paddle wheel having a first side and a second side and the paddle wheel having at least one paddle-like feature, the at least one paddle-like feature is placed radially along the first side of the paddle wheel. Moreover, the method may provide a lubrication device including the inner cover first mating surface and the outer cover second mating surface fitting together to form a casing, the paddle wheel nesting inside the casing, the first side of the paddle wheel facing the second side of the inner cover, the paddle wheel being free to rotate within the casing, a sealing component may be placed between the inner cover first mating surface and the outer cover second mating surface to form a substantially fluid tight seal and rotating the paddle wheel may cause circulation of a lubricant within the traction motor drive end bearing.

These and other aspects and features of the present disclosure will be more readily understood when the following detailed description is read in light of the accompanying drawings.

DETAILED DESCRIPTION

Figure 1:
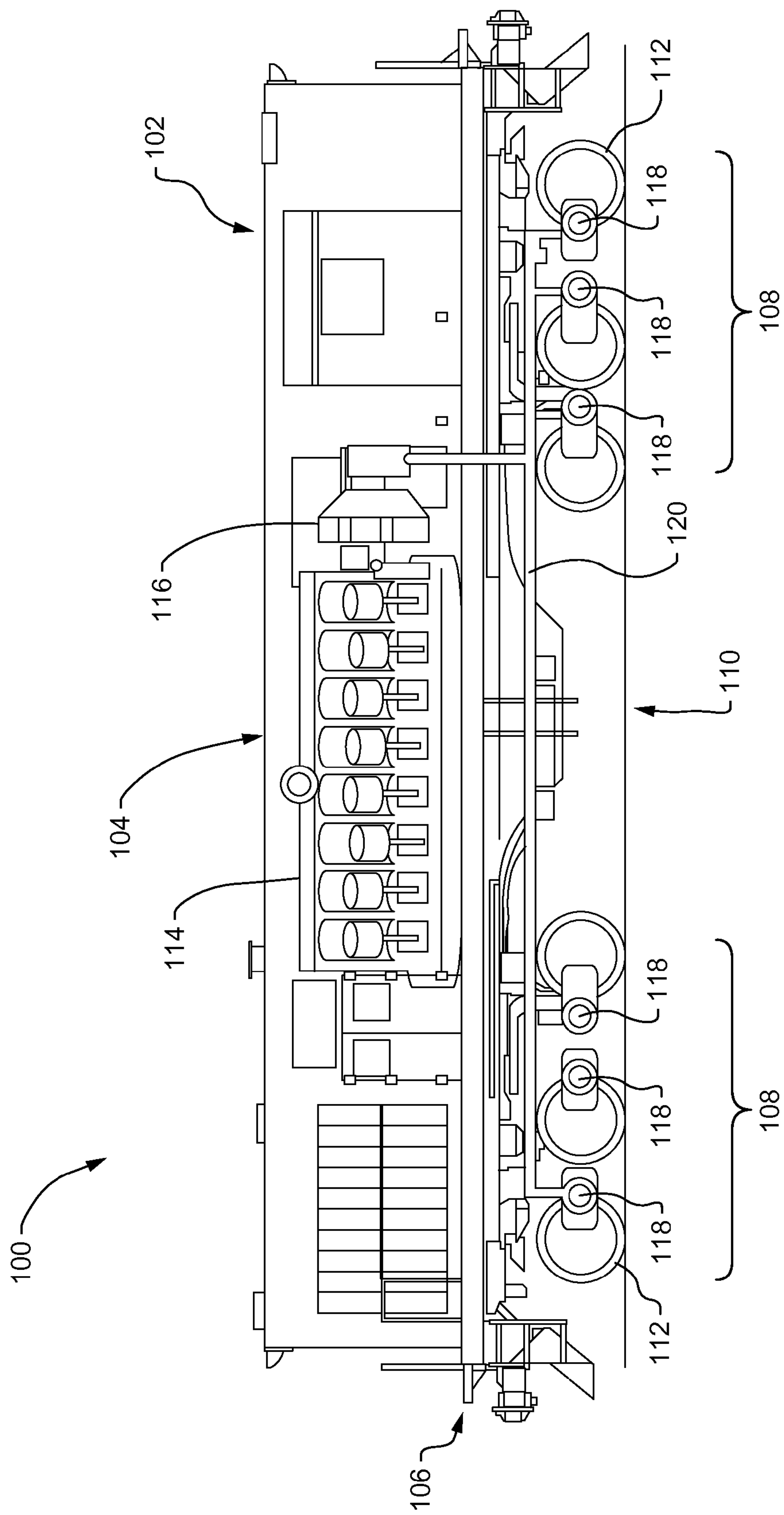
FIG. 1 is a diagrammatic cutaway view of an exemplary locomotive in accordance with the present disclosure.

Referring now to the drawings and with specific reference to FIG. 1, a locomotive consistent with an embodiment of the present disclosure is generally referred to by reference numeral 100. Although a locomotive 100 is illustrated, any type of vehicle or machine that incorporates a traction motor may benefit from the present disclosure. In some embodiments, the locomotive 100 may push or pull one or more rail cars behind it (not shown) such as: a tender car, a passenger car, a cargo container car, or another type of car. The locomotive 100 may be constructed to include a cab 102 that contains controls (not shown). A locomotive operator may use the controls to operate the locomotive 100 and a car body 104 that rests on a frame 106. Furthermore, the frame 106 is supported at opposing ends by first and second trucks 108. Each truck 108 may be configured to engage a rail 110 through a plurality of wheels 112, and to also support the frame 106 of the locomotive 100. Additionally, one or more engines 114 may be mounted to the frame 106 and the one or more engines 114 may drive a generator 116 to produce electricity. The electricity produced by the generator 116 may be delivered to the traction motors 118 through an electrical transmission path 120. In one embodiment, the electrical transmission path 120 may be constructed with cables, wires or any other known electrical transmission devices. The traction motors 118 are configured to drive the plurality of wheels 112 included within each truck 108. Furthermore, the plurality of wheels 112 may be provided in sets, with each set of wheels 112 being mounted on the frame 106 via the truck 108. The traction motors 118 may use electrical power received from the generator 116 to drive the wheels 112 and propel the locomotive 100 down the rail 110.

Figure 2:
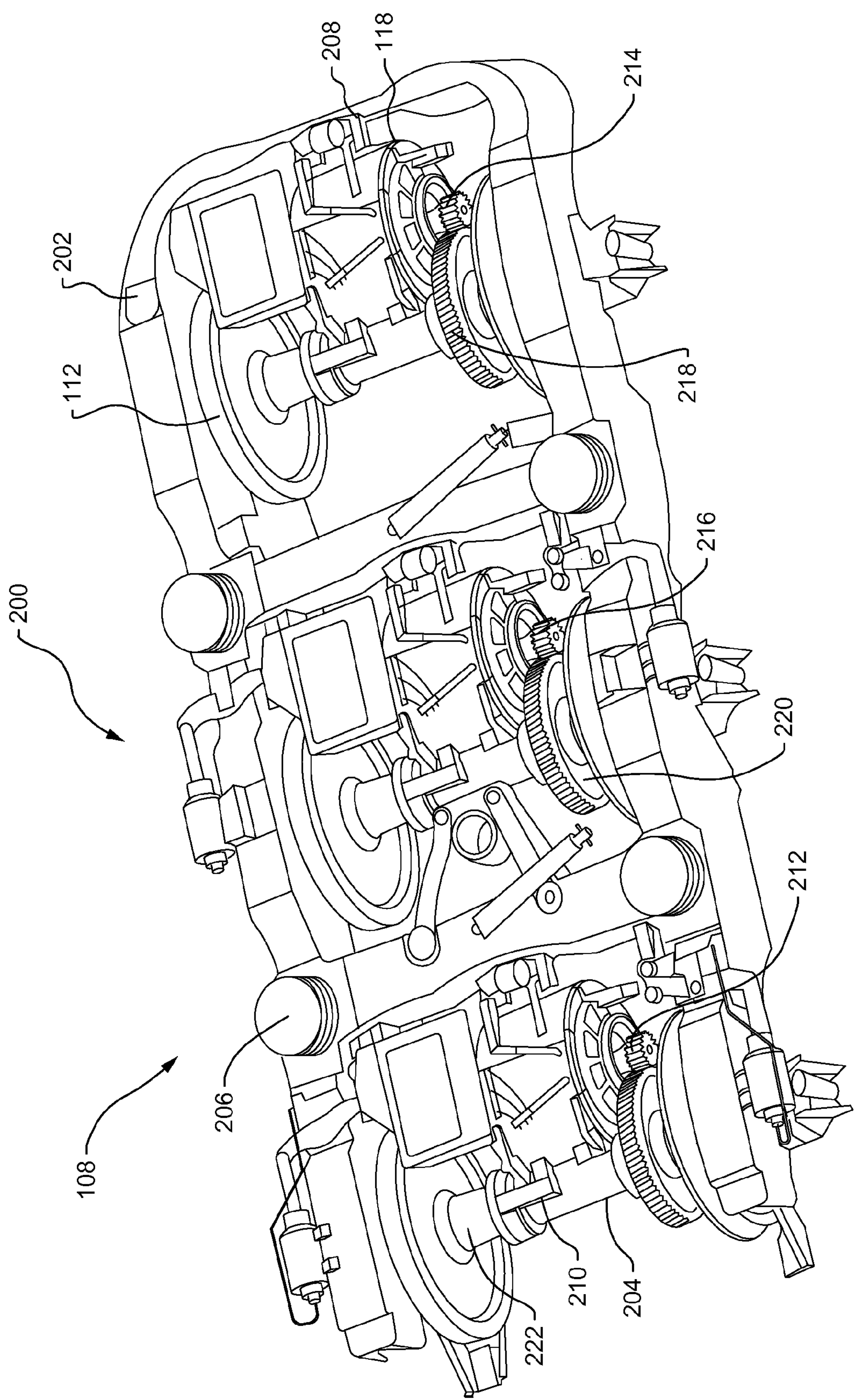
FIG. 2 is a perspective view of an exemplary truck as shown in the locomotive of FIG. 1.

FIG. 2 illustrates in greater detail an exemplary embodiment of one of the locomotive trucks 108 as first shown in FIG. 1. The truck 108, also commonly referred to as a bogie, is configured to provide a subassembly chassis 200 that may include a truck frame 202 that can be configured to support one or more of the wheels 112, one or more of the axles 204, one or more of the traction motors 118, and other components required by the locomotive 100. Additionally, the truck 108 may be attached to the frame 106 (FIG. 1) of the locomotive 100. Furthermore, the truck 108 may incorporate one or more springs 206 to aid in the absorption of vibrations transferred from one or more of the wheels 112 to the frame 106 (FIG. 1) and the body 104 (FIG. 1) as the locomotive 100 is propelled down the rail 110.

As further illustrated in FIG. 2, in some embodiments, the traction motors 118 may be attached to the truck frame 202. Each traction motor 118 may be rigidly attached to the truck frame 202 at a first attachment point 208 and rigidly attached to the axle 204 at a second attachment point 210. Each traction motor 118 may be attached at the first and second attachment points 208 and 210 using attachment methods incorporating bolts, nuts, pins, mounting brackets, or other known methods. Attachment of each traction motor 118 at the attachment points 208 and 210 may be flexible or rigid in nature.

Each traction motor 118 may also contain a traction motor drive shaft 212 extending laterally away from an end portion of the traction motor 118 and may enter a gear case (not shown) adjacent to the traction motor 118 through a first opening (not shown) in the gear case (not shown). Inside the gear case, a first smaller gear 214 (e.g. a pinion gear) may be rigidly coupled and/or otherwise mounted to the distal end of the traction motor drive shaft 212. Attachment of the pinion gear 214 to the traction motor drive shaft 212 may be accomplished by an interference fit, friction fit, shrink fit, a pair of nuts (not shown), and/or other known mounting methods. An exemplary interference fit, or friction fit, may be created when an inner diameter of the pinion gear 214 is smaller compared to an outer diameter of the traction motor drive shaft 212. An exemplary shrink fit may be achieved by heating or cooling the pinion gear 214 or the traction motor drive shaft 212 such that the pinion gear 214 slides onto the traction motor drive shaft 212 and, once the pinion gear 214 and the traction motor drive shaft 212 reach the ambient temperature; the two components are rigidly coupled. In exemplary embodiments, due to the rigid coupling between the pinion gear 214 and the traction motor drive shaft 212, rotation of the traction motor drive shaft 212 may cause the pinion gear 214 to rotate in conjunction with and/or at the same rate as the traction motor drive shaft 212.

In some embodiments, the pinion gear 214 may contain a series of gear teeth 216 that may mesh with a corresponding series of gear teeth 218 on a second, larger gear 220 (e.g. a bull gear) that may also be disposed within the gear case (not shown). In exemplary embodiments, the pinion gear 214 may drive the bull gear 220 due to the pinion gear teeth 216 meshing with the bull gear teeth 218. In some embodiments, the pinion gear 214 and the bull gear 220 may require a lubricant (not shown) to minimize wear of the pinion gear 214 and the bull gear 220. The lubricant (not shown) used may be grease, oil, or other known lubricant and the lubricant may be stored in a sump located in or on the gear case (not shown). Furthermore, inside the gear case (not shown), the bull gear 220 may be mounted to a wheel shaft 222 via an interference fit, friction fit, shrink fit, a pair of nuts (not shown), and/or other known mounting methods. An exemplary interference fit may be accomplished when an inner diameter of the bull gear 220 is smaller compared to an outer diameter of the wheel shaft 222. Furthermore, an exemplary shrink fit may be accomplished by heating or cooling the bull gear 220 and/or the wheel shaft 222 sufficiently such that the bull gear 220 slides or fits onto the wheel shaft 222. When the bull gear 220 and the wheel shaft 222 both reach an ambient temperature the two structures are rigidly attached. In exemplary embodiments, the bull gear 220 may rotate in conjunction with the wheel shaft 222 due to the rigid coupling between the bull gear 220 and the wheel shaft 222. The wheel shaft 222 may exit gear case (not shown) through a second opening (not shown) of the gear case (not shown). Outside the gear case (not shown), the wheel 112 may be rigidly mounted to the wheel shaft 222 in any number of ways, for example, an interference fit, friction fit, shrink fit, a pair of nuts (not shown), and/or other known mounting methods.

Figure 3:
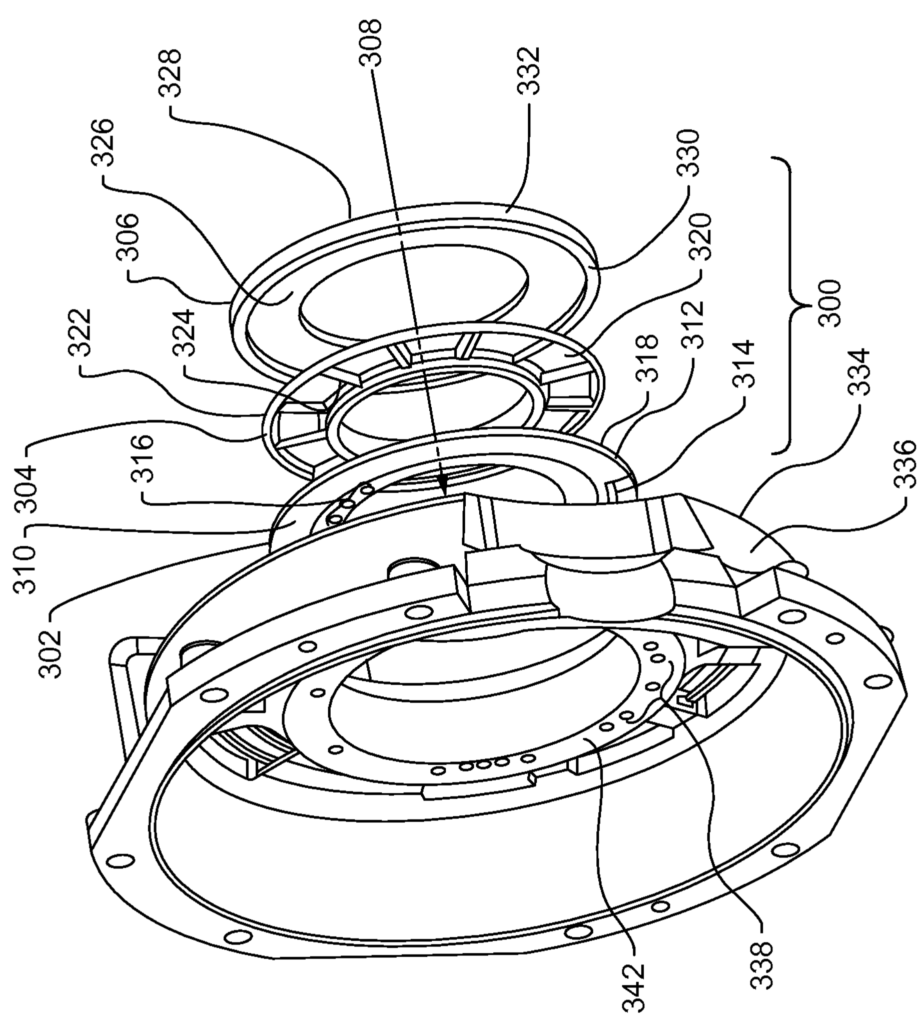
FIG. 3 is an exploded perspective view of the self-contained drive end bearing lubrication device alongside the drive end bearing housing in accordance with the present disclosure.
Figure 4:
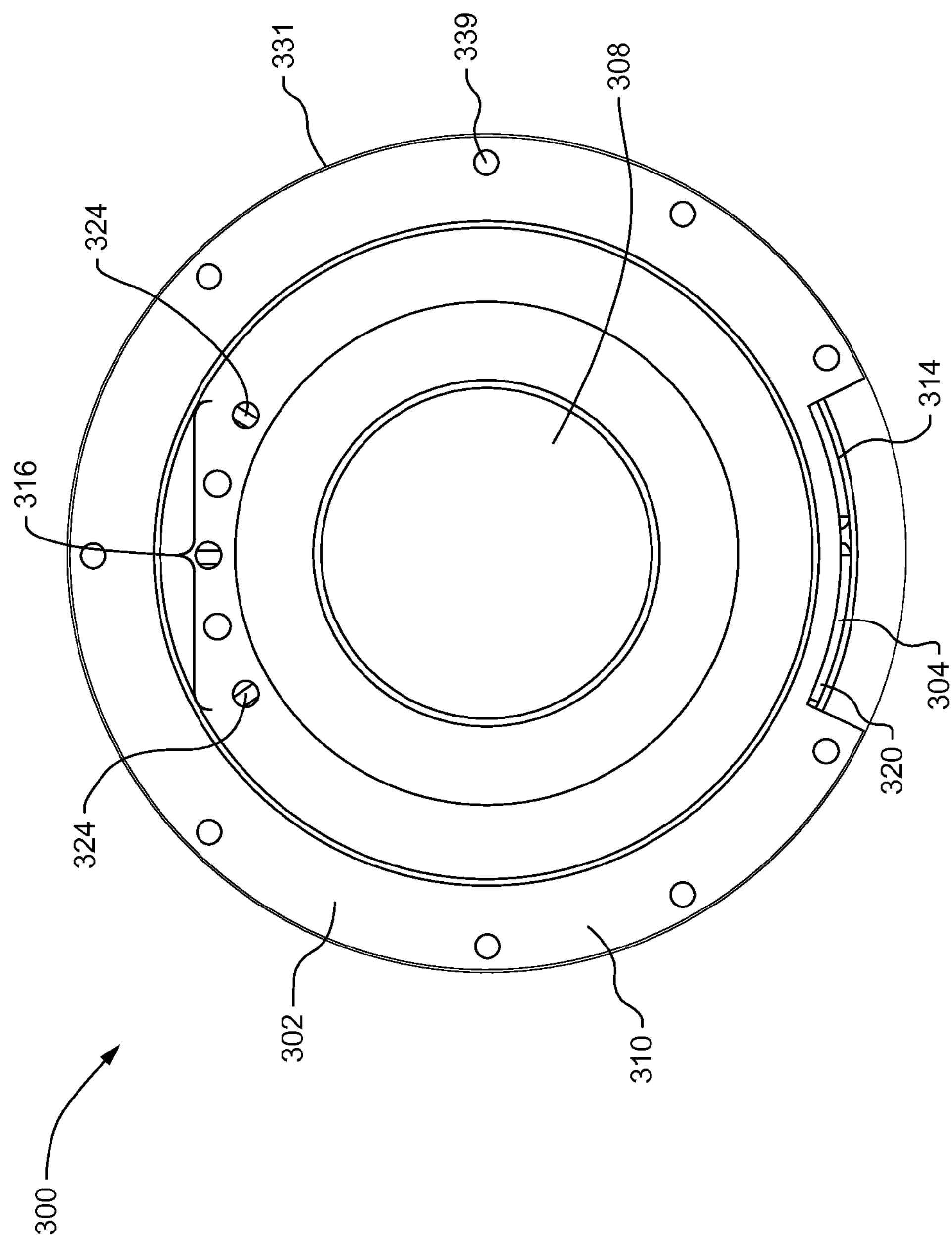
FIG. 4 is a perspective view of an exemplary self-contained drive end bearing lubrication device in accordance with the present disclosure.

Turning to FIGS. 3 and 4 an exemplary embodiment of a self-contained drive end bearing lubrication device is depicted and referred to by reference number 300. As shown, the bearing lubrication device 300 may include an inner cover 302, a paddle wheel 304, and an outer cover 306. In some embodiments, the inner cover 302 and the outer cover 306 may be constructed out of plastic, stainless steel, aluminum or any other suitable material. Likewise, in some embodiments, the paddle wheel 304 may be constructed out of plastic, stainless steel, aluminum, or any other suitable material. In an exemplary embodiment, the inner cover 302, the paddle wheel 304, and the outer cover 306 may be annular in shape having an inner diameter and outer diameter. A central opening 308 may be present in the inner cover 302, paddle wheel 304, and outer cover 306. The opening 308 may provide access for the drive shaft 212 of the traction motor 118. In some embodiments, the diameter of the drive shaft 212 may be smaller than the diameter of the opening 308 in the inner cover 302, paddle wheel 304 and outer cover 306. Furthermore, in other embodiments, the diameter of the drive shaft 212 may be substantially the same, slightly smaller or slightly larger than the diameter of opening 308 in the inner cover 302, paddle wheel 304 and outer cover 306.

Moreover, the inner cover 302 may include a first side 310 and a second side 312. In some embodiments, the inner cover 302 may have at least one aperture 314 at a first location extending through the first side 310 to the second side 312. Additionally, the inner cover 302 may have at least one aperture 316 at a second location extending through the first side 310 to the second side 312 of the inner cover 302. In some embodiments, the apertures 314 and 316 may be a slot, a series of slots, a hole, a series of holes, or any other such openings that may be known. Furthermore, in some embodiments, apertures 314 and 316 may be offset from one another on inner cover 302. In one exemplary embodiment the inner cover 302 may have the apertures 314 and 316 offset approximately 180 degrees with respect to one another. Other arrangements of the apertures 314 and 316 are possible. Moreover, the inner cover 302 may have a mating surface 318 along the second side 312 of the inner cover 302.

As further shown in FIGS. 3 and 4, the paddle wheel 304 may include a first side 320 and a second side 322 and having at least one paddle-like feature 324 on the first side 320 of the paddle wheel 304. In some embodiments, the paddle-like feature 324 may be a raised structure on the first side 320 of the paddle wheel 304. Furthermore, in some embodiments, the paddle-like feature 324 may be formed by an indentation on the first side 320 of the paddle wheel 304. Additionally, in some embodiments, the paddle-like features 324 may be organized in a circular array along the first side 320 of the paddle wheel 304 and the paddle-like features 324 may extend radially from the inner diameter to the outer diameter of paddle wheel 304. Alternatively, the at least one paddle-like feature 324 may be randomly distributed along the first side 320 of the paddle wheel 304, other arrangements of the paddle-like features 324 are possible.

Likewise, the outer cover 306 also may have a first side 326 and a second side 328. Additionally, the outer cover 306 may have a mating surface 330 along the first side 326 of the outer cover 306. In some embodiments, an annular lip 332 may be added to a circumference of the outer cover 306 and the annular lip 332 may include the mating surface 330. Furthermore, the outer cover 306 and inner cover 302 may fit together at the outer cover mating surface 330 and the inner cover mating surface 318 respectively to create a casing 331. Additionally, in some embodiments, the mating surface 330 on the outer cover 306 may incorporate a sealing element or component (not shown) such as a gasket, an o-ring, or other known combination of sealing elements to create a substantially fluid tight seal. Moreover, in some embodiments the mating surface 318 on the inner cover 302 may incorporate sealing elements to create a substantially fluid tight seal. In some embodiments, it may be advantageous for the inner cover 302 and outer cover 306 to fit together and form a substantially fluid tight seal.

Furthermore, the paddle wheel 304 may be configured to reside or nest within the casing 331 formed by the inner cover 302 and outer cover 306. In some embodiments, the paddle wheel 304 may be able to freely rotate within the casing 331 formed by the inner cover 302 and outer cover 306. Additionally, the paddle wheel 304 may be orientated such that the first side 320 with at least one paddle-like feature 324 is facing the second side 312 of the inner cover 302. Whereas, in some embodiments the inner cover 302, the paddle wheel 304, and the outer cover 306 may fit together and form a self-contained lubrication device 300.

Figure 5:
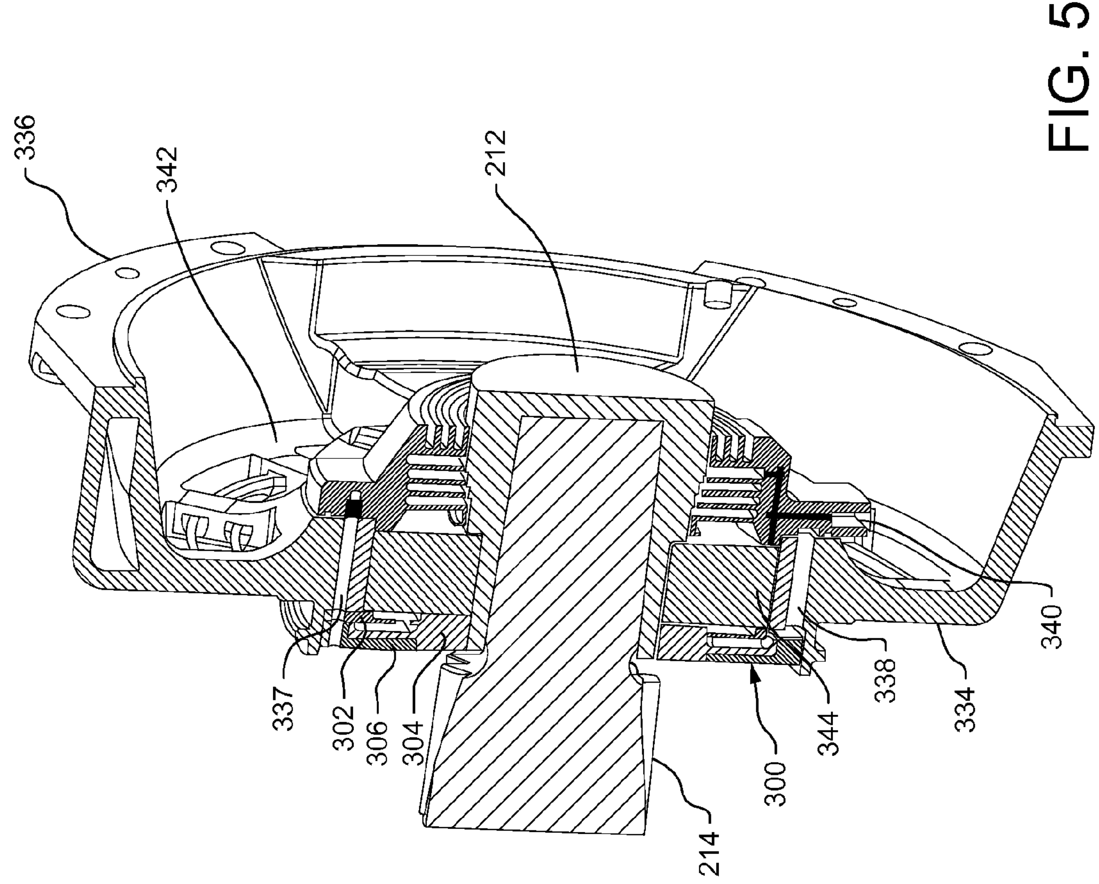
FIG. 5 is a cross-sectional view of the self-contained drive end bearing lubrication device alongside the drive end bearing housing in accordance with the present disclosure.

FIG. 5 shows an embodiment where the self-contained drive end bearing lubrication device 300 may be positioned having the traction motor drive shaft 212 extending through the opening 308 of the self-contained lubrication device 300. The inner cover 302 may be a non-rotating member of the self-contained lubrication device 300 and may be rigidly attached to a second side 334 of a drive end bearing housing 336. In some embodiments, the inner cover 302 may serve as an inner wall of lubrication device 300. Moreover, attachment of the inner cover 302 to the bearing housing 336 may be accomplished through the use of an attachment device 337 such as screws, pins, adhesive, or any other known attachment methods. In other embodiments, the inner cover 302 portion of the self-contained lubrication drive end bearing lubrication device 300 may be placed adjacent to and not rigidly attached to the second side 334 of the bearing housing 336.

Moreover, the paddle wheel 304 may be rigidly coupled to the traction motor drive shaft 212 using an interference fit, friction fit, shrink fit, and/or other known mounting method. An exemplary interference fit or friction fit may be achieved by fabricating the opening 308 in paddle wheel 304 to have a smaller inner diameter compared to the outer diameter of the traction motor drive shaft 212. Furthermore, an exemplary shrink fit may be accomplished by heating or cooling the paddle wheel 304 or the traction motor drive shaft 212 sufficiently such that the paddle wheel 304 slides or fits onto the traction motor drive shaft 212 and when the paddle wheel 304 and the traction motor drive shaft 212 both reach ambient temperature the two structures are rigidly attached. Furthermore, the rigid coupling of the paddle wheel 304 and the traction motor drive shaft 212 may allow the paddle wheel 304 to rotate in conjunction with and at the same rate as the traction motor drive shaft 212. Additionally, the rigid coupling of the paddle wheel 304 and the traction motor drive shaft 212 may create a substantially fluid tight seal between the paddle wheel 304 and the traction motor drive shaft 212.

In some embodiments, the outer cover 306 may also be a non-rotating member of the self-contained drive end bearing lubrication device 300 and the outer cover may be substantially non-contacting with paddle wheel 304 in the radial and axial directions. In some examples the outer cover 306 may serve as an outer wall of the lubrication device 300. Additionally, the outer cover 306 may help create a substantially fluid tight seal where the mating surface 330 of the outer cover and the mating surface 318 of the inner cover are joined together.

Furthermore, in some embodiments, the outer cover 306 may incorporate multiple rubbing-type sealing elements (not shown) to prevent lubricant from traveling beyond the paddle wheel 304. The sealing elements (not shown) may be constructed out of a low-friction material such as polytetrafluoroethylene (PTFE) or other known low-friction material. Additionally, the sealing elements (not shown) may be annular in shape having an inner diameter and an outer diameter and configured in a concentric circular pattern. In some embodiments the sealing elements may have a thickness between 0.005 and 0.020 inches, however other thicknesses are possible. Moreover, the multiple sealing elements may be fixed or attached to the first side 326 of the outer cover 306 using glue, pressure sensitive adhesive or other known attachment method.

Additionally, in some embodiments a low-friction coating (not shown) may be applied to the second side 322 of the paddle wheel 304. The low-friction coating (not shown) may be composed of a material such as PTFE but use of other known material with low-friction properties is possible. The low-friction coating may be applied by a vapor, liquid, heat or other known application method. Moreover, the low-friction coating on the paddle wheel 304 may correspond with the multiple sealing elements (not shown) attached to the outer cover 306 to prevent lubricant from traveling beyond the paddle wheel in an outward direction.

Furthermore, in some embodiments the self-contained drive end bearing lubrication device 300 may be coupled to the bearing housing 336. In one example, as shown in FIGS. 3 and 5, attachment to the bearing housing 336 may be achieved along the first side 310 of the inner cover 302 and the second side 334 of the bearing housing 336 using attachment devices 337 such as screws, bolts, pins, adhesive, or other known adhesion techniques. In some embodiments, the lubrication device 300 may be configured such that the inner cover 302 is positioned facing and adjacent to the second side 334 of the bearing housing 336. Furthermore, the bearing housing 336 may have at least one aperture 338 extending through the bearing housing 336.

During attachment to the drive end bearing housing 336, the self-contained lubrication device 300 may be orientated such that the first side 310 of the inner cover 302 is facing the bearing housing 336 and the aperture 314 on the inner cover 302 at least partially overlaps with the aperture 338 on bearing housing 336. Moreover the inner cover 302 and the outer cover 306 may have multiple corresponding attachment device holes 339 that can facilitate attachment of the self-contained lubrication device 300 to the drive end bearing housing 336. Additionally, the attachment devices 337 placed in the attachment device holes 339 may help facilitate the joining of inner cover 302 with outer cover 306 to form the casing 331.

Furthermore, in some embodiments a reservoir 340 may be placed adjacent to, or in other cases, may be fixedly attached to a first side 342 of the drive end bearing housing 336. The reservoir 340 may contain a lubricant such as grease, oil, or other known lubrication material. In some embodiments, the lubricant used for the drive end bearing 344 may have a lower viscosity than the lubricant used for the pinion gear 214 and/or the bull gear 220. Furthermore, in some embodiments, the lubricant used for the drive end bearing 344 may be supplied from a different source than lubricant used for the pinion gear 214 and the bull gear 220.

INDUSTRIAL APPLICABILITY

In operation, traction motors may be used as a propulsion source in electric vehicles. More specifically, traction motors may find use in diesel-electric, hybrid-electric and battery-electric vehicles such as locomotives, automobiles, buses, trucks, electric multiple units, and the like.

Figure 6:
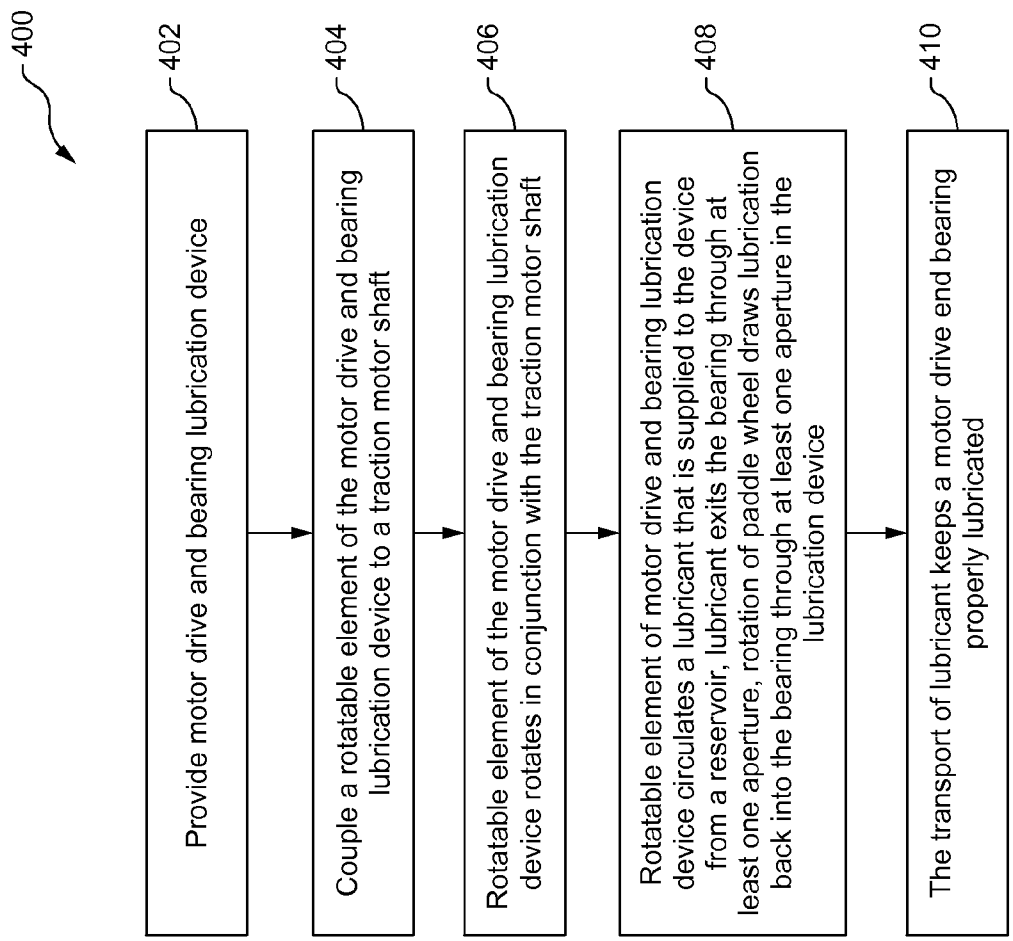
FIG. 6 is a flow chart depicting a sample sequence of steps which may be practiced in accordance with the present disclosure.

A method of lubricating a traction motor drive end bearing 400 as described in the present disclosure is shown in FIG. 6. The first step 402 of method 400 may require providing a motor drive end bearing lubrication device 300. Such a device, as described in the present disclosure, may be composed of multiple components. For example, the lubrication device 300 may have an inner cover 302, a paddle wheel 304 and an outer cover 306 and the inner cover 302 and outer cover 306 may fit together and form a casing 331. Furthermore the paddle wheel 304 may nest inside the casing 331 and the paddle wheel may be free to rotate.

According to the next step 404 of method 400 a rotatable element of the lubrication device 300 may be coupled to a traction motor drive shaft 212. In one exemplary embodiment of the method 400, the rotatable element may be the paddle wheel 304 and the paddle wheel 304 may be directly coupled to the traction motor drive shaft 212. As a result, step 406 may further describe how the rotation of the traction motor drive shaft 212 may cause the paddle wheel 304 of the drive end bearing lubrication device 300 to rotate in conjunction with the traction motor drive shaft 212. This rotation of the paddle wheel 304 may create a circulation path as described in step 408, for the lubricant to follow. The lubricant may be drawn from the reservoir 340 through the aperture 338 in the bearing housing 336. Furthermore, the lubricant may continue to travel through the at least one aperture 338 and enter the self-contained lubrication device 300 by way of the opening or aperture 314 of the inner cover 302. Moreover, rotation of the paddle wheel 304 with the at least one paddle-like feature 324 may help facilitate circulation of the lubricant within the drive end bearing. As the lubricant is pulled into the self-contained lubrication device 300 through the aperture 314 at a first location of the inner cover 302, the paddle wheel 304 with the paddle-like structure 324 will transport the lubricant to a position adjacent to the aperture 316 at a second location on the inner cover 302 and allow the lubricant to flow into the drive end bearing. This transport and circulation of lubricant within lubrication device 300 may help keep the traction motor drive end bearing properly lubricated.

It will be appreciated that use of traction motors in electric vehicles can provide the capability to supply high torque at high speeds. However, operating under these conditions may require traction motors to incorporate large drive end bearings which may require lubrication to function properly. Typically, a traction motor is configured to use a common sump located in the gear case to provide lubrication for both a drive end bearing and a set of reduction gears. Unfortunately, traditional lubrication methods may not be adequate in certain applications because the large size and speed of the drive end bearing may push the limits of traditional lubricants (e.g., grease). Therefore, some embodiments of the present disclosure may benefit from or even require the use of a lower viscosity lubricant for the drive end bearing (e.g., oil). However, the use of a lower viscosity lubricant with traditional lubrication methods may create additional issues such as placing undesirable demands onto the gear case to serve as a leak-proof sump for the low viscosity lubricant. Typical traction motor gear cases are becoming increasingly complex having multiple interfaces and other features and such configurations may make it more difficult to ensure the gear case is leak proof.

Accordingly, the current application discloses a self-contained lubrication device for drive end bearings of a traction motor. The lubrication device may include an inner cover that has a first side, a second side, and a first mating surface along the second side. Moreover, the lubrication device for drive end bearings may include an outer cover that has a first side, a second side, and a second mating surface along the first side. Additionally, the lubrication device for drive end bearings may have a paddle where that has a first side and a second side. Furthermore, the first mating surface of the inner cover and the second mating surface of the outer cover may fit together to form a casing and the paddle wheel may nest inside the casing with the first side of the paddle wheel facing the second side of the inner cover.

The above description is meant to be representative only, therefore modifications and variations may be made to the disclosed embodiments without departing from the scope of the disclosure. In considering the specification, other embodiments of the present disclosure will be apparent to individuals skilled in the art. Thus, it is intended these modifications fall within the scope of the present disclosure and fall within the appended claims.

What is claimed is:

1. A lubrication device for a traction motor, comprising:

an inner cover, the inner cover having a first side and a second side, the second side having a first mating surface;

an outer cover, the outer cover having a first side and a second side, the first side having a second mating surface; and a paddle wheel, the first mating surface of the inner cover and the second mating surface of the outer cover fitting together to form a casing, the paddle wheel nesting inside the casing, positioned between the inner cover and the outer cover.

2. The device of claim 1, wherein the inner cover, the outer cover, and the paddle wheel are annular in shape.

3. The device of claim 1, wherein a first sealing element is placed between the first mating surface of the inner cover and the second mating surface of the outer cover to form a substantially fluid tight seal.

4. The device of claim 3, wherein the second mating surface of the outer cover has an annular lip to assist in forming the substantially fluid tight seal.

5. The device of claim 1, wherein the paddle wheel is non-contacting with the inner cover and the outer cover and the paddle wheel is free to rotate within the casing.

6. The device of claim 1, wherein the inner cover is non-rotating and is non-contacting with the paddle wheel in radial and axial directions and the outer cover is non-rotating and is non-contacting with the paddle wheel in radial and axial directions.

7. The device of claim 6, wherein the outer cover has at least one second sealing element attached to the first side of the outer cover, the second sealing element being annular in shape.

8. The device of claim 1, wherein the paddle wheel has a first side and a second side and the paddle wheel has at least one paddle-like feature, the at least one paddle-like feature is placed radially along the first side of the paddle wheel.

9. The device of claim 1, wherein the inner cover has a first location with at least one aperture extending through the first side to the second side of the inner cover and a second location with at least one aperture extending through the first side to the second side of the inner cover.

10. The device of claim 9, wherein the at least one aperture at the first location and the at least one aperture at the second location are offset approximately 180 degrees with respect to one another.

11. A traction motor assembly, comprising:

a traction motor drive shaft;

a drive end bearing to facilitate rotation of the traction motor drive shaft;

a bearing housing arranged to contain the drive end bearing; and a drive end bearing lubrication device for lubrication of the motor drive end bearing, the motor drive end bearing lubrication device having an inner cover, the inner cover having a first side and a second side, the second side having a first mating surface, an outer cover, the outer cover having a first side and a second side, the first side having a second mating surface; and a paddle wheel, the first mating surface of the inner cover and the second mating surface of the outer cover fitting together to form a casing and the paddle wheel nesting inside the casing between the inner cover and the outer cover, the casing and the paddle wheel having a central opening extending through the inner cover, the outer cover and the paddle wheel, the traction motor drive shaft extending through the central opening in the casing and the paddle wheel.

12. The traction motor assembly of claim 11, wherein the inner cover, the outer cover and the paddle wheel are annular in shape and a first sealing element is placed between the first mating surface of the inner cover and the second mating surface of the outer cover to form a substantially fluid tight seal.

13. The traction motor assembly of claim 11, wherein the paddle wheel has a first side and a second side, the first side having at least one paddle-like feature, the at least one paddle-like feature is placed radially along the first side.

14. The traction motor assembly of claim 11 wherein the inner cover and outer cover are non-rotating and are non-contacting with the paddle wheel in radial and axial directions, the paddle wheel is free to rotate within the casing, and the paddle wheel is rigidly coupled to the traction motor drive shaft, the paddle wheel rotating in conjunction with the traction motor drive shaft.

15. The traction motor assembly of claim 11, wherein the first side of the inner cover of the motor drive end bearing lubrication device is positioned adjacent to the bearing housing and the outer cover has at least one second sealing element attached to the first side of the outer cover, the second sealing element being annular in shape.

16. The traction motor assembly of claim 11, wherein the inner cover has a first location with at least one aperture extending through the first side to the second side of the inner cover, a second location with at least one aperture extending through the first side to the second side of the inner cover, and the at least one aperture at the first location and the at least one aperture at the second location are offset approximately 180 degrees with respect to one another.

17. A method of lubricating a traction motor drive end bearing, comprising:

providing a motor drive end bearing lubrication device on a traction motor drive shaft, the motor drive end bearing lubrication device having an inner cover, the inner cover having a first mating surface, an outer cover, the outer cover having a second mating surface and a paddle wheel, the paddle wheel having a first side, a second side, and the paddle wheel having at least one paddle-like feature, the at least one paddle-like feature is placed radially along the first side of the paddle wheel;

the inner cover first mating surface and the outer cover second mating surface fitting together to form a casing, the paddle wheel nesting inside the casing, the first side of the paddle wheel facing the second side of the inner cover, the paddle wheel being free to rotate within the casing, a first sealing element being placed between the inner cover first mating surface and the outer cover second mating surface to form a substantially fluid tight seal and;

rotating the paddle wheel to create circulation of a lubricant within the traction motor drive end bearing.

18. The method of claim 17, further includes the inner cover, the outer cover and the paddle wheel having a central opening, the traction motor drive shaft extending through the central opening, the paddle wheel rigidly coupling to the traction motor drive shaft and rotating in conjunction with the traction motor drive shaft, the inner cover and outer cover being non-rotating and non-contacting with the paddle wheel in radial and axial directions.

19. The method of claim 17, further includes providing the inner cover with a first location having at least one aperture extending through a first side to a second side of the inner cover, a second location having an at least one aperture extending through the first side to the second side of the inner cover, and offsetting the at least one aperture at the first location and the at least one aperture at the second location by approximately 180 degrees with respect to one another.

20. The method of claim 19, further includes the lubricant communicating through the drive end bearing lubrication device through the at least one aperture at the first location of the inner cover, circulating the lubricant using the paddle wheel within the lubrication device, directing the lubricant into the drive end bearing through the at least one aperture at the second location of the inner cover, the outer cover having at least one second sealing element attached to the first side of the outer cover, the second sealing element being annular in shape and configured to prevent the lubricant from traveling beyond the paddle wheel.

* * * * *